(No Model.)
H. B. RICHARDS.
POISON DISTRIBUTER.
No. 423,814. Patented Mar. 18, 1890.
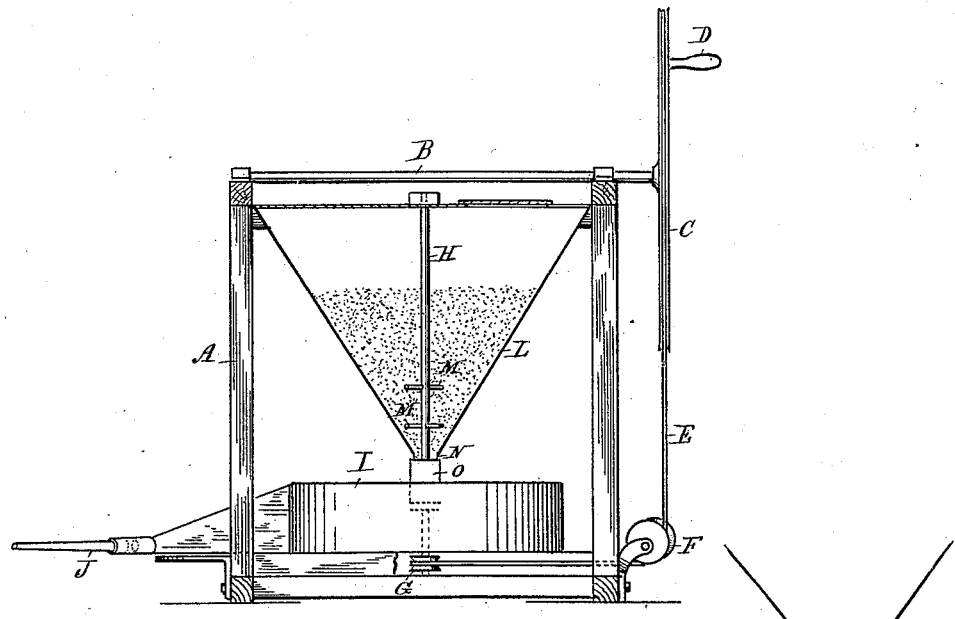
Fig. I.
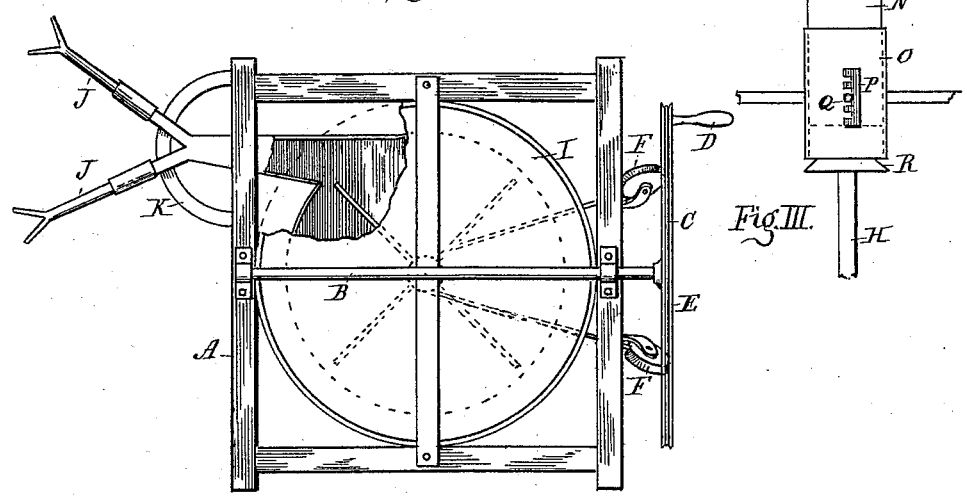
Fig. II.
Fig. III.
WITNESSES:
R. S. Millar
Robert Kirk
INVENTOR:
H. B. Richards.
By O. J. Bailey,
Attorneys.

UNITED STATES PATENT OFFICE.

HENRY B. RICHARDS, OF LA GRANGE, TEXAS.

POISON-DISTRIBUTER.

SPECIFICATION forming part of Letters Patent No. 423,814, dated March 18, 1890.

Application filed October 3, 1889. Serial No. 325,885. (No model.)

*To all whom it may concern:*

Be it known that I, HENRY B. RICHARDS, of La Grange, in the county of Fayette and State of Texas, have invented a new and useful Improvement in Poison - Distributers, which improvement is fully set forth in the following specification and accompanying drawings, in which—

Figure I is a side elevation of my improved apparatus for distributing insecticides; Fig. II, a top or plan view of the same, and Fig. III the device for regulating the supply of material to the blower.

My invention relates to improvements in machines for exterminating insects of various kinds which prey upon and destroy plants and other forms of vegetable life.

It is admitted that the application of poisons in solution is only a partial remedy, by reason of the fact that in that form they cannot be brought into contact with every part of an infested plant. They furthermore invariably retard the growth and often kill the plant.

It has also been demonstrated that the devices hitherto employed to distribute pulverized poisons are defective for the same reason. They are designed to discharge the poison directly upon the plants. By this process the powder, being exceedingly light, is blown through and beyond the foliage. The plants are violently agitated and tossed by the action of the blower, and the powder is thereby dislodged and the greater portion wasted.

The object of my invention is to obviate the defects referred to by providing a simple, inexpensive, and thoroughly-efficient device whereby pulverized poisons may be rapidly ejected, not directly upon the plants, but mainly into the surrounding atmosphere. The impalpable particles are thus thoroughly diffused, and gradually and quietly subside and produce the desired effect upon every object within a wide range.

The construction and operation of the machine will be easily understood by reference to the accompanying drawings, in which A designates a plain rectangular frame, on the top of which is journaled a transverse shaft B, carrying a band-wheel C, operated by the handle D. A band E passes under friction-rollers F and transmits motion to a pulley G on a vertical shaft H, which carries a horizontal fan or blower I, having a series of flexible discharge-tubes J, supported on a segment K. It is understood that these tubes are not designed to eject the poison directly upon the plants, but rather into the atmosphere above them; and if the plants should be as high or higher than the plane of the discharge the mouths of the tubes should be inclined slightly upward. A sub-conical hopper L, with air-tight cover, is suitably attached to the upper part of the frame-work. The vertical shaft H is provided with a suitable number of agitators M to prevent the clogging of the powder in its passage to the blower. The contents of the hopper pass into the blower through a tube N, which is surrounded by movable sleeve O, having a slot P, provided on one side with a series of teeth, which adjustably engage a pin Q, attached to the tube N. A conical collar R is mounted on the vertical shaft H immediately below the sleeve. By raising or lowering the position of the sleeve the quantity of material admitted into the blower may be easily regulated. It will also be observed that the powder, being drawn into the blower with the air, is at once exposed to the action of the outward current and cannot accumulate in the interior of the blower and impede its action.

No running-gear is required for this machine, as it may be placed upon any ordinary vehicle. No costly gearing or other iron-work, involving unnecessary weight as well as expense, is demanded for its construction. All the material needed is cheap and everywhere accessible, and the entire apparatus may be built by any workman of ordinary mechanical skill. Experimental machines, which have been successfully operated, do not exceed ninety pounds in weight. I furthermore claim that with my device operatives are less exposed to the poison compounds than when attending the machines which discharge their contents downwardly in the usual manner.

What I claim as new is—

1. The frame A, having on its top the shaft B, the band-wheel C on said shaft, the band D, passing over and operated by said wheel, and thence passing over rollers F and moving the horizontally-disposed fan-blower I, having flexible discharge-tubes J, the conical hopper L, attached to said frame, and the vertical shaft H with said hopper, having agitators M and carried by the pulley G on said shaft, substantially as and for the purposes set forth.

2. In a machine as described, the hopper L, attached to the frame and having an air-tight cover and combined with the shaft H, having collar R, agitators M, and the tube N, having pin Q attached to it, the movable and slotted sleeve O having on one side the series of teeth engaging pin Q, all adapted to operate in the manner as described.

In testimony that I claim the foregoing I have hereunto set my hand, this 20th day of September, 1889, in the presence of witnesses.

HENRY B. RICHARDS.

Witnesses:
JOHN P. EHLINGER,
JOHN T. DUNCAN.